United States Patent
Wakayama et al.

(10) Patent No.: US 12,506,316 B2
(45) Date of Patent: Dec. 23, 2025

(54) OPTICAL COUPLER AND OPTICAL AMPLIFIER

(71) Applicant: KDDI CORPORATION, Tokyo (JP)

(72) Inventors: Yuta Wakayama, Fujimino (JP); Takehiro Tsuritani, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 965 days.

(21) Appl. No.: 17/687,344

(22) Filed: Mar. 4, 2022

(65) Prior Publication Data
US 2022/0190542 A1 Jun. 16, 2022

Related U.S. Application Data

(63) Continuation of application No. PCT/JP2020/031975, filed on Aug. 25, 2020.

(30) Foreign Application Priority Data

Nov. 21, 2019 (JP) .................. 2019-210580

(51) Int. Cl.
*H01S 3/00* (2006.01)
*G02B 6/02* (2006.01)
(Continued)

(52) U.S. Cl.
CPC ...... *H01S 3/06708* (2013.01); *G02B 6/02042* (2013.01); *H01S 3/091* (2013.01)

(58) Field of Classification Search
CPC .. H01S 3/06708; H01S 3/091; G02B 6/02042
See application file for complete search history.

(56) References Cited

U.S. PATENT DOCUMENTS 5,594,823 A * 1/1997 Tardy .................. G02B 6/2856
385/115
5,625,728 A 4/1997 Tardy et al.
(Continued)

FOREIGN PATENT DOCUMENTS

CN 102890310 A 1/2013
EP 4064468 A1 * 9/2022 ........... G02B 6/2852
(Continued)

OTHER PUBLICATIONS

Hotate, "Optical Fiber and Its Applications-VIII, Fiber Optic Devices (1)-Single-Mode Fiber-Optic Devices", Optics, vol. 19, 6$^{th}$ issue, Jun. 1990, with English translation, 19 pages.
(Continued)

*Primary Examiner* — Mark Hellner
(74) *Attorney, Agent, or Firm* — Foley & Lardner LLP

(57) ABSTRACT

An optical coupler includes N members. A Kth (K is an integer of 1 to N) member includes a MCF including P (P is an integer of N or greater) cores, and a marker disposed at a position closest to a first core, and at least one SCF. A core of the SCF of the Kth member is coupled to a coupled core other than the first core. Cores of the MCF of an Mth (M is an integer of 1 to N−1) member are connected to cores of the MCF of an (M+1)th member. A total number of SCF included in the N members is P. Each of P cores of the MCFs configured through the connection of the N members is connected to a core of one of the SCFs.

10 Claims, 5 Drawing Sheets

(51) Int. Cl.
 H01S 3/067 (2006.01)
 H01S 3/091 (2006.01)

(56) References Cited

U.S. PATENT DOCUMENTS

| | | |
|---|---|---|
| 2012/0087626 A1 | 4/2012 | Nagashima et al. |
| 2014/0036351 A1* | 2/2014 | Fini ..................... G02B 6/2856 359/341.32 |
| 2017/0160466 A1* | 6/2017 | Imamura .............. G02B 6/0288 |

FOREIGN PATENT DOCUMENTS

| | | | |
|---|---|---|---|
| JP | S62-017709 A | 1/1987 | |
| JP | 2013213915 A * | 10/2013 | ............... G02B 6/04 |
| WO | WO-02/075404 A1 | 9/2002 | |
| WO | WO-2016/035883 | 3/2016 | |

OTHER PUBLICATIONS

Zhang et al., "A Tuneable Multi-Core to Single Mode Fiber Coupler," IEEE Photonics Technology Letters, vol. 29, No. 7, Apr. 1, 2017 (pp. 591-594).

* cited by examiner

| 4-CORE MC OPTICAL COUPLER | | | | MC OPTICAL FIBER |
|---|---|---|---|---|
| OPTICAL MEMBER #1 | OPTICAL MEMBER #2 | OPTICAL MEMBER #3 | OPTICAL MEMBER #4 | |
| 11 | 14 | 13 | 12 | 11 |
| 12 | 11 | 14 | 13 | 12 |
| 13 | 12 | 11 | 14 | 13 |
| 14 | 13 | 12 | 11 | 14 |

OPTICAL COUPLER AND OPTICAL AMPLIFIER

CROSS-REFERENCE TO RELATED APPLICATION(S)

This application is a continuation of International Patent Application No. PCT/JP2020/031975 filed on Aug. 25, 2020, which claims priority to and the benefit of Japanese Patent Application No. 2019-210580 filed on Nov. 21, 2019, the entire disclosures of which are incorporated herein by reference.

BACKGROUND OF THE INVENTION

Field of the Invention

The present invention relates to an optical coupler and an optical amplifier.

Description of the Related Art

NPL 1 discloses a polished optical coupler. The polished optical coupler disclosed in NPL 1 is an optical coupler formed by polishing the claddings of two single-mode (SM) optical fibers and disposing the cores of the two SM optical fibers close to each other. By closely disposing the cores of the two SM optical fibers, it is possible to change a signal propagating through one of the cores to the other core. NPL 1 discloses that an optical coupler having any of various coupling ratio is obtained by adjusting the distance between cores and a length over which the cores are disposed closely.

NPL 1: Kazuo Hotate, "Optical Fiber and Its Applications-VIII, Fiber Optic Devices (1)-Single-Mode Fiber-Optic Devices", Optics, volume 19, 6th issue, June, 1990

In recent years, multicore (MC) optical fibers have been used in order to increase the transmission capacities of optical communication systems. An MC optical fiber is an optical fiber that includes a plurality of cores. In a communication system that uses an MC optical fiber, a pair consisting of an optical transmitting apparatus and an optical receiving apparatus transmits/receives signal light via one of the cores of the MC optical fiber. Thus, for example, in an optical communication system that uses an MC optical fiber that includes P (P is an integer of two or greater) cores, an optical component that connects the cores of P single-core (SC) optical fibers and the P cores of the MC optical fiber is required. Hereinafter, an optical component that connects the cores of P SC optical fibers and the P cores of an MC optical fiber is referred to as a "P-core MC optical coupler".

A P-core MC optical coupler can be generated by applying the polished optical coupler disclosed in NPL 1 to an MC optical fiber and disposing each of the cores of P SC optical fibers close to one of the P cores of the MC optical fiber, for example. However, usually, a marker for distinguishing/identifying the cores is provided in the cladding of an MC optical fiber. The marker has a refractive index different from those of the cores and the cladding, and thus the coupling ratio between a core disposed close to the marker from among a plurality of cores of the MC optical fiber and the core of an SC optical fiber decreases relative to the coupling ratio between another core of the MC optical fiber and the core of an SC optical fiber.

SUMMARY OF THE INVENTION

According to one aspect of the present invention, an optical coupler includes first to Nth (N is an integer of two or greater) members, a Kth (K is an integer of 1 to N) member includes: a multicore optical fiber that includes first to Pth (P is an integer of N or greater) cores disposed at regular intervals in a circular shape, and a marker disposed at a position closest to the first core from among the first to Pth cores, and at least one single-core optical fiber, a core of the single-core optical fiber of the Kth member is coupled to a coupled core that is other than the first core from among the first to Pth cores, cores of the multicore optical fiber of an Mth (M is an integer of 1 to N−1) member are connected to cores of the multicore optical fiber of an (M+1)th member, a total number of single-core optical fibers that are included in the first to Nth members is P, and each of P cores of the multicore optical fibers configured through the connection of the first to Nth members is connected to a core of one of the P single-core optical fibers included in the first to Nth members.

Further features of the present invention will become apparent from the following description of exemplary embodiments with reference to the attached drawings.

DESCRIPTION OF THE EMBODIMENTS

Figure 1:
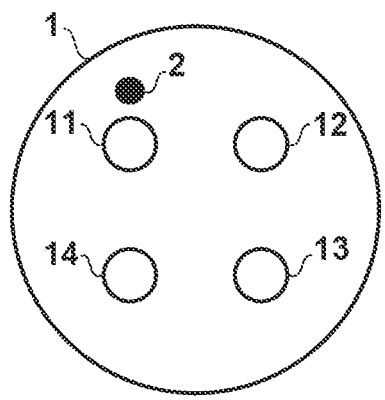
FIG. 1 is a cross-sectional view of a four-core MC optical fiber.

Hereinafter, embodiments will be described in detail with reference to the attached drawings. Note that the following embodiments are not intended to limit the scope of the claimed invention, and all of the combinations of features described in the embodiments are not necessarily essential to the invention. Two or more of the multiple features described in the embodiments may be combined as appropriate. Furthermore, the same reference numerals are given to the same or similar configurations, and redundant description thereof is omitted.

First Embodiment

A P-core MC optical coupler (P is an integer of two or greater) according to this embodiment will be described below. Note that, in this embodiment, P=4. FIG. 1 shows a cross section of an MC optical fiber 1 that is used in a four-core MC optical coupler, on a plane orthogonal to the longitudinal direction thereof. The MC optical fiber 1 includes four cores 11 to 14 in cladding. The cores 11 to 14 are disposed at regular intervals on a circle of a predetermined radius centered on the center of the cross section. Specifically, the distances between the center of the cross section and the cores are the same, and an angle formed by two line segments that connect the center of the cross section and two adjacent cores (hereinafter, the angle between cores) is the same with respect to all of the combinations of two adjacent cores. In a case of a four-core MC optical fiber, the angle between cores is $2\pi/4=\pi/2$. Note that, in a case of P-core MC optical fiber, the angle between cores is $2\pi/P$.

Moreover, the cladding of the MC optical fiber 1 includes a marker 2. The marker 2 is provided in order to distinguish/identify the cores 11 to 14. The core that is closest to the marker 2 is the core 11, for example, and the cores can be specified in the clockwise direction in the order of the core 11, the core 12, the core 13, and the core 14. The marker 2 is configured with a refractive index different from those of the cores 11 to 14 and the cladding.

A four-core MC optical coupler can be configured by cutting the cladding portion from the outer periphery side of the MC optical fiber 1, and disposing the cores of four SC optical fibers closely to the cores 11 to 14, respectively, for example. However, the marker 2 is provided in the vicinity of the core 11, and thus the coupling ratio between the core 11 and the core of an SC optical fiber that is coupled to the core 11 decreases relative to the coupling ratio between each of the cores 12 to 14 and the core of an SC optical fiber. In this embodiment, the differences between the coupling ratios between the cores of SC optical fibers and the cores of MC optical fibers are decreased.

Figure 2:
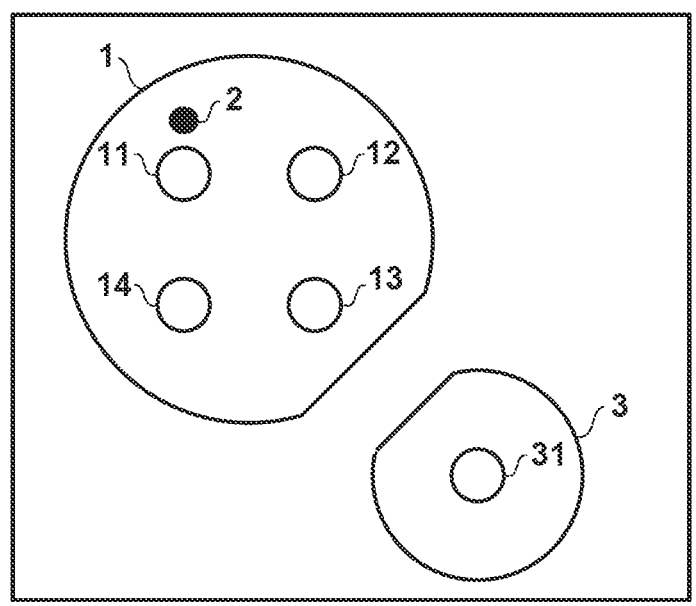
FIG. 2 is a diagram illustrating a method for generating an optical member that is used in a four-core MC optical coupler according to an embodiment.
Figure 3:
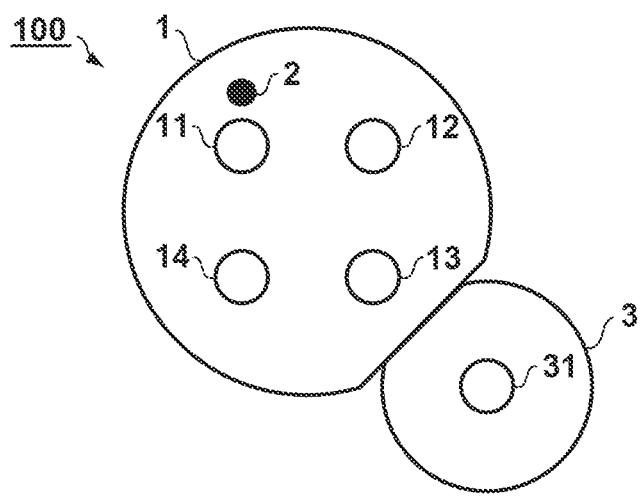
FIG. 3 is a diagram showing an optical member that is used in a four-core MC optical coupler according to an embodiment.

A method for manufacturing a four-core MC optical coupler will be described below. As shown in FIG. 2, the cladding is polished from a portion of the outer peripheral surface of the MC optical fiber 1 that is closest to the core 13 whose distance from the marker 2 is longest. Also, the cladding of an SC optical fiber 3 that includes a core 31 is polished away. As shown in FIG. 3, the polished surface of the MC optical fiber 1 and the polished surface of the SC optical fiber 3 are then fused. In the following description, the polished surface of the MC optical fiber 1 and the polished surface of the SC optical fiber 3 fused to each other as shown in FIG. 3 is referred to as an "optical member 100".

As described in NPL 1, when a wavelength (frequency) of light that is to be coupled is set, the coupling ratio between the core 31 and the core 13 depends on the distance between the core 31 and the core 13 and the length in the longitudinal direction over which the core 13 and the core 31 are disposed close to each other. That is to say, the amounts of polishing of the MC optical fiber 1 and the SC optical fiber 3 and the length of polishing in the longitudinal direction thereof are determined based on a coupling ratio required between the core 13 and the core 31.

Note that the core 31 can also be coupled to the core 11, 12, and 14. The coupling ratio between the core 31 and each of the cores 11, 12, and 14 also depends on the distance between the cores and the length of polishing in the longitudinal direction. Therefore, to be more specific, the amounts of polishing of the MC optical fiber 1 and the SC optical fiber 3 and the length of polishing in the longitudinal direction thereof are determined such that the coupling ratio between the core 31 and each of the core 11, 12, and 14 is smaller than or equal to a predetermined value or is a minimum (for example, 0, that is to say, no coupling) and the coupling ratio between the core 31 and the core 13 is used as a target value. Note that the coupling ratio between the core 31 and each of the cores 11, 12, and 14 is set smaller than the coupling ratio between the core 31 and the core 13.

In this embodiment, the optical members 100 shown in FIG. 3 are generated in correspondence with the number of cores P, that is to say, in this example, four optical members 100 are generated. These four optical members 100 have the same configuration, but, hereinafter, the four optical members 100 are referred to as an "optical member #1", an "optical member #2", an "optical member #3", and an optical member #4 in order to distinguish them from each other.

Figures 4A, 4B:
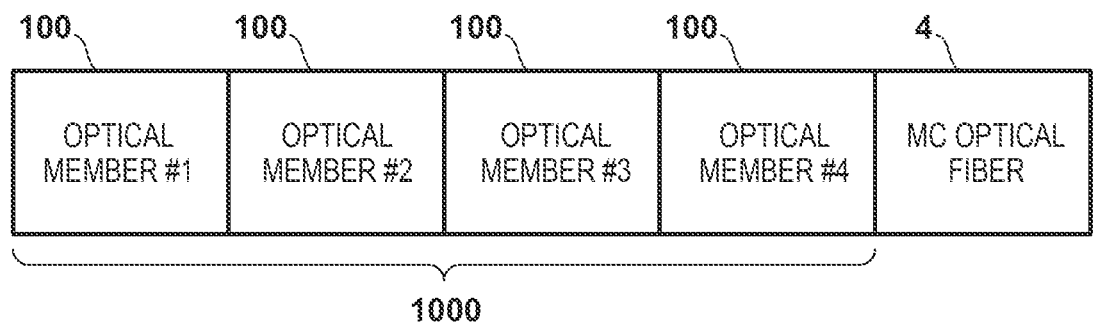
FIG. 4A is a diagram illustrating a configuration of a four-core MC optical coupler according to an embodiment.
FIG. 4B is a diagram illustrating a configuration of a four-core MC optical coupler according to an embodiment.

FIG. 4A is a diagram illustrating the configuration of a four-core MC optical coupler 1000 according to this embodiment. As shown in FIG. 4A, the four-core MC optical coupler 1000 is formed by connecting the four optical members 100 in series. Note that, in FIG. 4A, in order to simplify the figure, the SC optical fibers 3 are omitted. Note that, cross sections of the optical member #1 and the optical member #2 are connected to each other, for example, such that cores are connected to each other through fusing processing. The same applies between the optical member #2 and the optical member #3, and between the optical member #3 and the optical member #4.

In this embodiment, cross sections of an optical member #M (in this example, M is an integer of 1 to 3) and an optical member #M+1 are connected in a state where the core 11 of the optical member #M+1 is rotated relative to the core 11 of the optical member #M by $\pi/2$, that is to say by the angle between the cores. FIG. 4B shows connection states of cores when connected as described above. Note that, in FIG. 4B, a shaded core indicates a coupled core that is coupled to the core 31 of an SC optical fiber 3.

As shown in FIG. 4A and FIG. 4B, for example, a cross section that is other than the cross section of the optical member #4 connected to the optical member #3 is connected to an MC optical fiber 4. Note that the MC optical fiber 4 has the same configuration as the MC optical fiber 1. Assuming that the coupling ratio between the core 13 and the core 31 of the SC optical fiber 3 in each of the optical members 100 is 1, signal light from the core 31 of the SC optical fiber 3 of the optical member #1 is incident on the core 13 of the optical member #1, and is thereby incident on the core 13 of the MC optical fiber 4. Similarly, signal light from the core 31 of the SC optical fiber 3 of each of the optical members #2 to #4 is incident on the cores 14, 11, and 12 of the MC optical fiber 4. Therefore, signal light from the four SC optical fibers can be caused to be incident on the four cores of the MC optical fiber 4, respectively. When signal light #1 to #4 output by four different optical transmitting apparatuses are caused to be incident on the cores 31 of the SC optical fibers 3 of the respective optical members #1 to #4, for example, then the signal light #1 to #4 can be caused to be incident on the cores 13, 14, 11, and 12 of the MC optical fiber 4.

Note that the four-core MC optical coupler 1000 is directionless, and thus signal light that is incident on the four-core MC optical coupler 1000 from the cores 11, 12, 13, and 14 of the MC optical fiber 4 is to be incident on the cores 31 of the SC optical fibers 3 of the optical member #3, the optical member #4, the optical member #1, and the optical member #2. Thus, it is possible to cause the signal light #1 to #4 that propagates through the cores 11 to 14 of the MC optical fiber 4 to be incident to the four different optical receiving apparatuses via the cores 31 of the SC optical fibers 3 of the optical members #1 to #4.

In the four-core MC optical coupler 1000 according to this embodiment, all of the cores 31 of the four SC optical fibers 3 of the optical members #1 to #4 are coupled to the same core 13 of the MC optical fiber 1 of the same optical member. Therefore, the differences between the coupling ratios between the cores of the SC optical fibers and the four cores (one row in the table in FIG. 4B corresponds to one core) configured by connecting the optical members #1 to #4 in series decrease.

Note that, in this embodiment, the core 13 of the MC optical fiber 1 is coupled to the core 31 of the SC optical fiber 3, but a configuration can also be adopted in which the core 12 or the core 14 is coupled to the core 31 of the SC optical fiber 3. That is to say, it is sufficient that a core of the MC optical fiber 1 that is coupled to the core 31 of the SC optical fiber 3 is a core that is other than the core 11 and is not affected by the marker 2. In addition, in this embodiment, coupled cores of the MC optical fibers 1 of the optical members #1 to #1 are all cores 13, but it suffices for a coupled core to be a core that is other than the core 11 and is not affected by a marker 2, and the coupled cores do not need to be the same among the optical members #1 to #4. That is to say, for example, a configuration can also be adopted in which the cores 12 are coupled cores in the optical members #1 and #2, and the cores 14 are coupled cores in the optical members #3 and #4. Either way, P SC optical fibers and P cores of an MC optical fiber can be respectively coupled to each other by adjusting cores that are connected to each other in connection between optical members.

To be short, the P-core MC optical coupler according to this embodiment is constituted by first to Pth optical members. Each of the first to Pth members is constituted by one MC optical fiber having a predetermined length and one SC optical fiber. This MC optical fiber includes first to Pth cores disposed at regular intervals in a circular shape and a marker. The marker is disposed at a position closest to the first core. Moreover, the core of the SM optical fiber of a Kth optical member (K is an integer of 1 to P) is coupled to a coupled core other than the first core from among the first to Pth cores. The coupled core is one of the second to Pth cores, and may differ for each optical member or may be the same. In addition, the cores of the MC optical fiber of an Mth optical member (M is an integer of one to P−1) are connected to the cores of the MC optical fiber of an (M+1)th optical member. Note that the MC optical fibers 1 of the Mth optical member and the (M+1)th optical member are connected such that each of the P cores configured by sequentially connecting the first to Pth optical members in series is coupled to the core of one SM optical fiber.

If, for example, coupled cores of the optical members are the same, the cores of the MC optical fiber of the Mth optical member and the cores of the MC optical fiber of the (M+1)th optical member may be connected in a state where the first core of the (M+1)th optical member is rotated with respect to the first core of the Mth optical member by $2\pi/P$.

Second Embodiment

Figure 5:
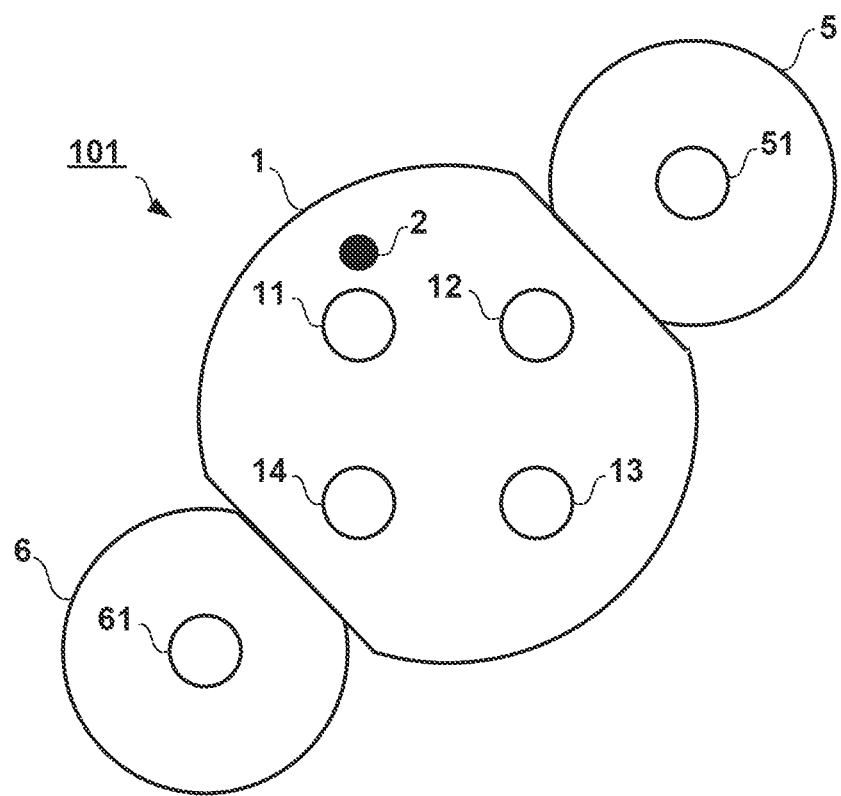
FIG. 5 is a diagram showing an optical member that is used in a four-core MC optical coupler according to an embodiment.

Next, a second embodiment will be described with focus on differences from the first embodiment. FIG. 5 shows an optical member 101 according to this embodiment. The optical member 101 is formed by coupling the core 12 of the MC optical fiber 1 and a core 51 of an SC optical fiber 5, and coupling the core 14 of the MC optical fiber 1 and a core 61 of an SC optical fiber 6. Note that the coupling ratio between the core 51 and each of the cores 11, 13, and 14 of the MC optical fiber 1 is set to a minimum value or lower than or equal to a predetermined value. Similarly, the coupling ratio between the core 61 and each of the core 11, 12, and 13 of the MC optical fiber 1 is set to a minimum value or lower or equal to a predetermined value.

In this embodiment, N (=P/2) optical members 101, each shown in FIG. 5, are generated, that is to say, in this example, two optical members 101 are generated. These two optical members 101 have the same configuration, but, hereinafter, the two optical members 101 are referred to as an "optical member #1" and an "optical member #2" in order to distinguish them from each other.

Figure 6A:
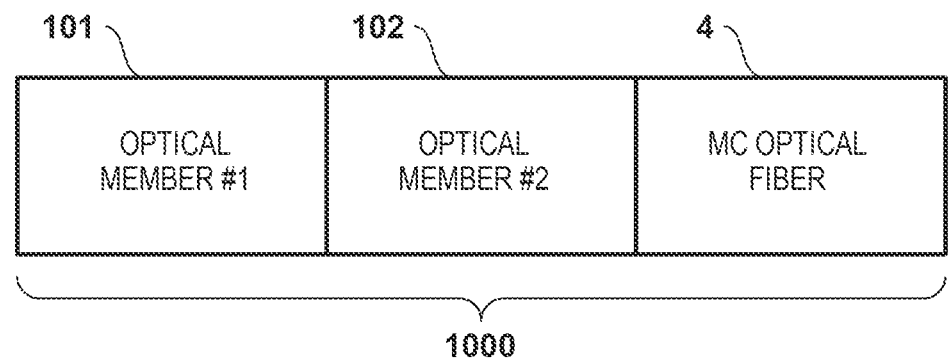
FIG. 6A is a diagram illustrating a configuration of a four-core MC optical coupler according to an embodiment.
Figure 6B:
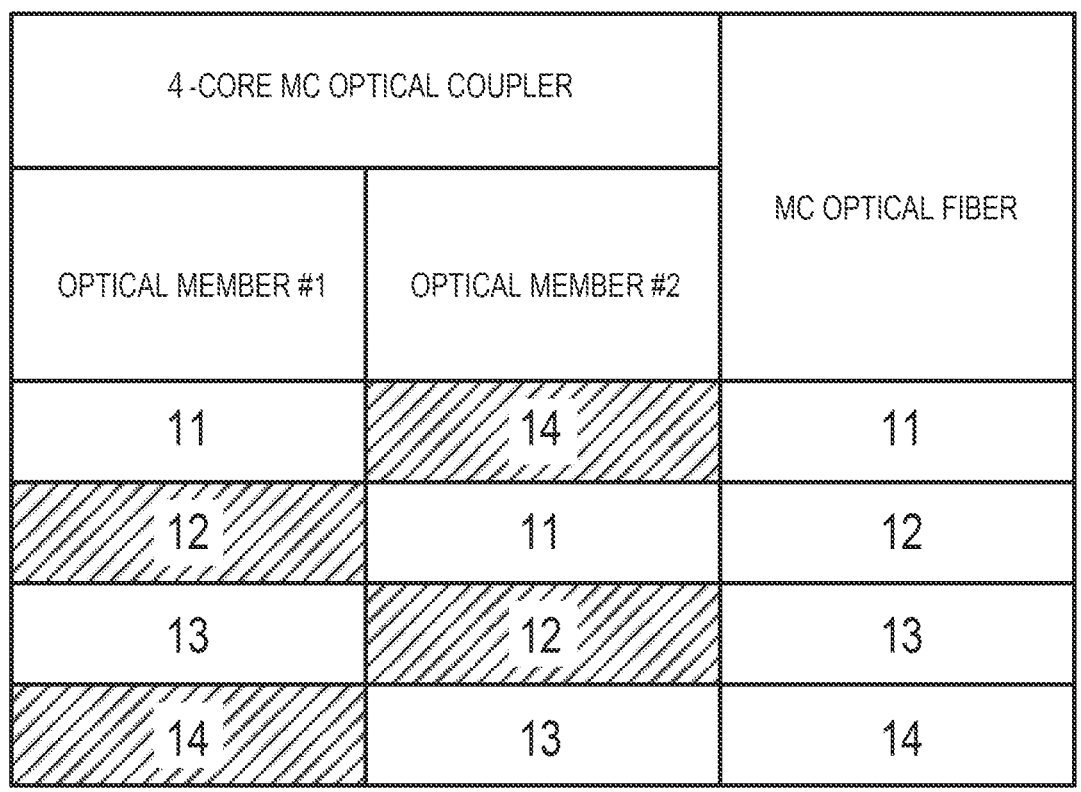
FIG. 6B is a diagram illustrating a configuration of a four-core MC optical coupler according to an embodiment.

FIG. 6A is a diagram illustrating the configuration of the four-core MC optical coupler 1000 according to this embodiment. As showing in FIG. 6A, the four-core MC optical coupler 1000 is formed by connecting two optical members, namely the optical members #1 and #2 in series. Note that, in FIG. 6A, in order to simplify the drawing, SC optical fibers 5 and 6 are omitted. Note that, also in this embodiment, cross sections of an optical member #M and an optical member #M+1 are connected in a state where the core 11 of the optical member #M+1 is rotated with respect to the core 11 of the optical member #1 by $\pi/2$, in other words, the angle between the cores. FIG. 6B shows connection states of the cores when connected as described above. Note that, in FIG. 6B, a shaded core indicates a coupled core that is coupled to the core 51 of the SC optical fiber 5 and the core 61 of the SC optical fiber 6.

As shown in FIGS. 6A and 6B, for example, a cross section other than the cross section of the optical member #2 that is connected to the optical member #1 is connected to an MC optical fiber 4. Note that the MC optical fiber 4 has the same configuration as the MC optical fiber 1. Assuming that the coupling ratio between a coupled core and the core of an SC optical fiber in each optical members 100 is 1, signal light from the core 51 of the SC optical fiber 5 of the optical member #1 is incident on the core 12 of the optical member #1, and is incident on the core 12 of the MC optical fiber 4. In addition, signal light from the core 61 of the SC optical fiber 6 of the optical member #1 is incident on the core 14 of the optical member #1, and is thereby incident on the core 14 of the MC optical fiber 4. Similarly, signal light from the core 51 of the SC optical fiber 5 and the core 61 of the SC optical fiber 6 of the optical member #2 is incident on the core 13 and the core 11 of the MC optical fiber 4, respectively. Therefore, signal light from the four SC optical fibers can be caused to be incident on the four cores of the MC optical fiber, respectively.

As described above, in this embodiment, one optical member has two SC optical fibers, and thus, two cores out of the four cores of the MC optical fiber 1 of one optical member are coupled cores. Note that a coupled core is a core other than the core 11. In addition, each of all of the four cores configured through series connection between optical members is coupled to the core of one SC optical fiber by adjusting cores of MC optical fibers that are connected to each other in series connection between optical members. With this configuration, it is possible to decrease the difference between the coupling ratios between the cores of SC optical fibers and the cores of MC optical fibers.

Note that, in this embodiment, coupled cores of the optical members are the same, but coupled cores do not need to be the same in the optical member 41 and the optical member #2. That is to say, for example, a configuration can also be adopted in which the cores 12 and 13 in the optical member #1 are coupled cores, and the cores 13 and 14 in the optical member #2 are coupled cores.

To be short, the P-core MC optical coupler according to this embodiment is constituted by the first to Nth optical members. Note that, in this embodiment, P is an even number, and N=P/2. The first to Nth optical members are each constituted by one MC optical fiber having a predetermined length and two SC optical fibers. This MC optical fiber includes first to Pth cores disposed at regular intervals in a circular shape, and a marker. The marker is disposed at a position that is closest to the first core. The cores of two SC optical fibers of a Kth optical member (K is an integer of 1 to N) are coupled to two different coupled cores that are other than the first core from among the first to Pth cores. A coupled core is one of the second to Pth cores, and may differ for each optical member, or may be the same. In addition, the cores of the MC optical fiber of an Mth optical member (M is an integer of 1 to N−1) are connected to the cores of the MC optical fiber of an (M+1)th optical member. Note that the MC optical fibers 1 of the Mth optical member and the (M+1)th optical member are connected such that each of P cores configured by sequentially connecting the first to Nth optical members in series is coupled to the core of one SC optical fiber.

A configuration may be adopted in which, for example, two coupled cores of each of the first to Nth optical members are the same, and are cores positioned on opposite sides to each other with respect to the center of the MC optical fiber (for example, the core 12 and the core 14 in FIG. 5). In this case, the cores of the MC optical fibers of the Mth optical member and the cores of the MC optical fiber of the (M+1)th member may be connected in a state where the first core of the (M+1)th optical member is rotated with respect to the first core of the Mth optical member by π/N.

Third Embodiment

Next, a third embodiment will be described with focus on differences from the first embodiment. The P-core MC optical coupler according to the second embodiment is an MC optical coupler formed by connecting, in series, the first to the Nth optical members, each of which has two SC optical fibers. Note that P is an even number, and N=P/2. In this embodiment, N=2. That is to say, in this embodiment, a P-core MC optical coupler is formed by connecting two optical members, namely a first optical member and a second optical member in series. Note that, similarly to the second embodiment, also in this embodiment, P is an even number, and each optical member has Q (Q=P/2) SC optical fibers. Coupled cores of each optical member are Q cores obtained by selecting every other core from the P cores disposed at regular intervals in a circular shape. Assume that, for example, P=10, cores indicated by reference numerals 1 to 10 are disposed in the clockwise direction, and a marker is provided at a position closest to the core 1. In this case, coupled cores can be indicated by even numbers. Cores indicated by even numbers are disposed at regular intervals in a circular shape. The P-core MC optical coupler can be configured by connecting the coupled cores of the first optical member to cores other than the coupled cores of the second optical member.

Fourth Embodiment

Each optical member has one SC optical fiber in the first embodiment, each optical member has two SC optical fibers in the second embodiment, and, in the third embodiment, two optical members each include Q=P/2 SC optical fibers. That is to say, in the first to third embodiments, the number of SC optical fibers included in each optical member is the same. However, the number of SC optical fibers, which corresponds to the number of coupled cores, can differ for each optical member. The first optical member includes three SC optical fibers, and the cores 12, 13 and 14 in FIG. 1 are used as coupled cores, for example. Also, the second optical member includes one SC optical fiber, and the core 13 in FIG. 1 is used as a coupled core. A four-core MC optical coupler can then be configured by coupling the core 13 of the second optical member to the core 11 of the first optical member.

To be short, the P-core MC optical coupler is constituted by the first to Nth optical members. Note that N is an integer of two or greater, and P is an integer of N or greater. Each of the first to Nth optical members is constituted by one MC optical fiber having a predetermined length and one or more SC optical fibers. Note that the total number of SC optical fibers included in the first to Nth optical members is P. The MC optical fiber of each optical member includes a marker and first to Pth cores disposed at regular intervals in a circular shape. The marker is disposed at a position that is closest to the first core. In addition, the core of the SM optical fiber of a Kth optical member (K is an integer of 1 to N) is coupled to a coupled core other than the first core from among the first to Pth cores. The coupled core is one of the second to Pth cores. Also, the cores of the MC optical fiber of an Mth optical member (M is an integer of 1 to N−1) are connected to the cores of the MC optical fiber of an (M+1)th optical member. Note that the MC optical fibers of the Mth optical member and the (M+1)th optical member are connected such that each of the P cores configured by sequentially connecting the first to Nth optical members in series is coupled to the core of one SM optical fiber.

Fifth Embodiment

Next, an optical amplifier that uses the P-core MC optical coupler described in the first to fourth embodiments will be described. In a communication system that uses a P-core MC optical fiber, a P-core MC erbium-doped fiber (EDF) is used in order to amplify signal light of each core. The P-core MC EDF includes P cores to which erbium is doped. As is well known, signal light is amplified as a result of the signal light and pump light propagating through a core to which erbium was doped. For this reason, pump light generated by a pump light source needs to be incident on the cores of the P-core MC EDF. For this reason, in this embodiment, the P-core MC optical coupler described in the first to fourth embodiments is used. That is to say, the P-core MC EDF according to this embodiment is configured by applying erbium to the P cores of the P-core MC optical coupler described in the first to fourth embodiments.

Figure 7A:
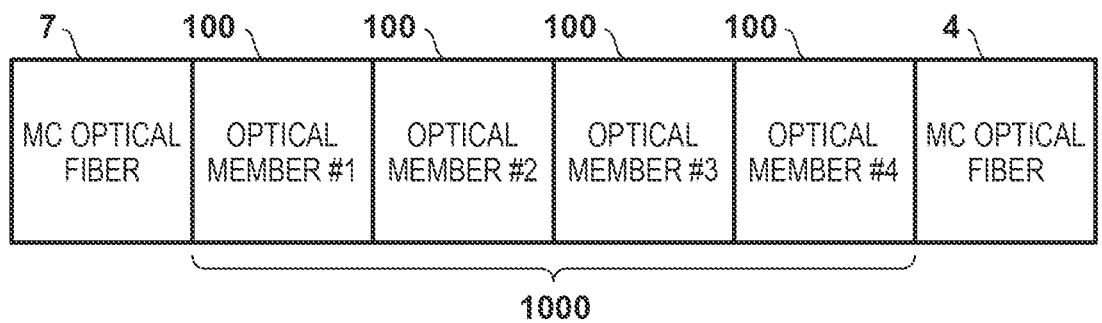
FIG. 7A is a diagram illustrating a configuration of a four-core MC-EDF according to an embodiment.
Figure 7B:
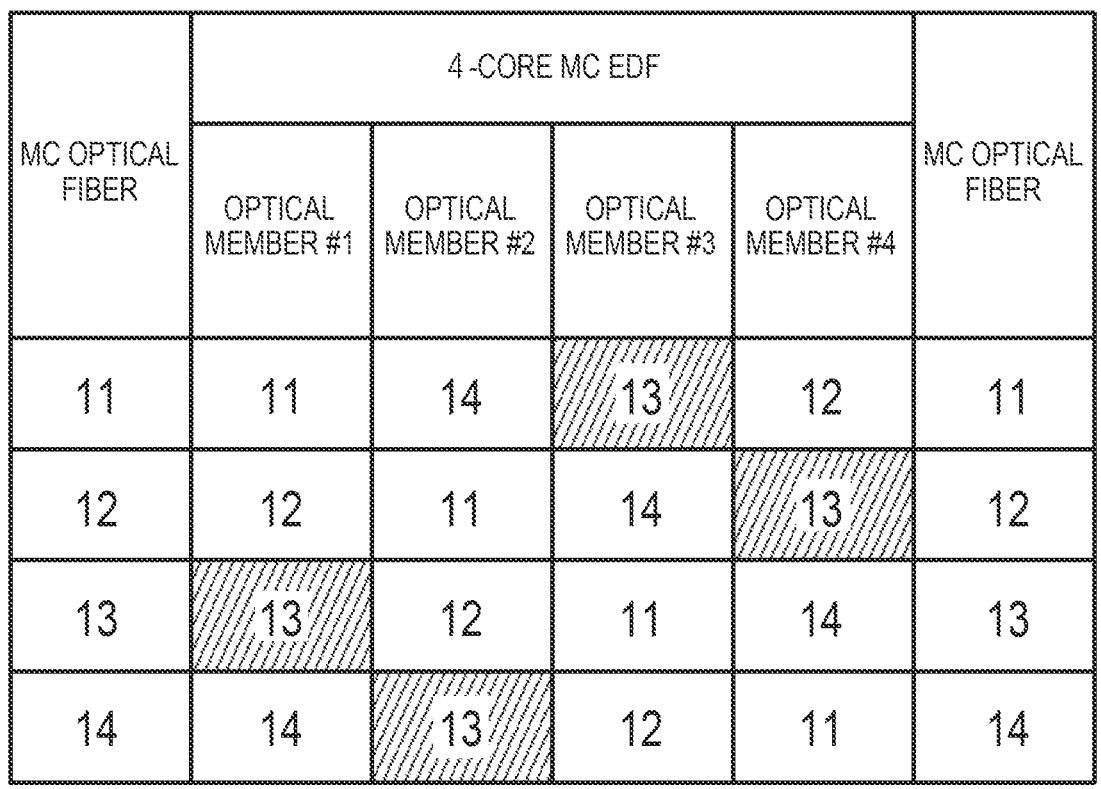
FIG. 7B is a diagram illustrating a configuration of a four-core MC-EDF according to an embodiment.

FIG. 7A is a diagram illustrating the configuration of the P-core MC EDF 1001 according to this embodiment. Note that, in FIG. 7A, the P-core MC optical coupler 1001 described in the first embodiment is used. Note that, as described above, the cores 11 to 14 of the MC optical fiber 1 are configured to amplify signal light using pump light. An MC optical fiber 7 and the MC optical fiber 4 are connected to the two ends of the P-core MC EDF 1001. The core arrangement of the MC optical fiber 7 and the MC optical fiber 4 is similar to that of the MC optical fiber 1. FIG. 7B shows an example in which the MC optical fiber 7 and the MC optical fiber 4 are connected to the cores of the P-core MC EDF 1001. Signal light #1 to #4 from the cores 11 to 14 of the MC optical fiber 7 is incident on the cores 11 to 14 of the MC optical fiber 4 via the P-core MC EDF 1001. In the optical member #1, pump light is incident on the core 13, and is used for amplification of the signal light #3. Similarly, pump light that is incident on the optical members #2 to #4 is used for amplification of the signal light #4, #1, and #2.

Note that, in this embodiment, pump light needs to be incident on the core 13 of the MC optical fiber 1 from the core 31 of the SC optical fiber 3, but signal light that propagates through the core 13 needs to be prevented from being incident on the core 31 of the SC optical fiber 3. The coupling ratio between cores depends on a wavelength of light in addition to the distance between the cores and the length in the longitudinal direction over which the cores are disposed closely. Usually, in light amplification, the wavelength of pump light and the wavelength of signal light are different. Therefore, the distance between the core 31 and the core 13 and the length in the longitudinal direction by which the cores are closely positioned are determined such that, at a wavelength of pump light, the coupling ratio between the core 31 and the core 13 is higher than a first predetermined value, and, at a wavelength of signal light, the coupling ratio between the core 31 and the core 13 is lower than a second predetermined value. Note that the second predetermined value is lower than or equal to the first predetermined value. Note that, in a case of an optical amplifier, there is no problem if pump light of the SC optical fiber 3 is incident on the cores 11, 12, and 14. Therefore, unlike the first embodiment, there is no need to adopt a configuration in which the coupling ratios between the core 31 and the cores 11, 12, and 14 at a wavelength of pump light do not need to be set to a minimum value or set lower than a predetermined value.

The present invention is not limited to the above embodiments and various changes and modifications can be made within the spirit and scope of the present invention. Therefore, to apprise the public of the scope of the present invention, the following claims are made.

What is claimed is:

1. An optical coupler comprising first to Nth (N is an integer of two or greater) members,
   wherein a Kth (K is an integer of 1 to N) member includes:
      a multicore optical fiber that includes first to Pth (P is an integer of N or greater) cores disposed at regular intervals in a circular shape, and a marker disposed at a position closest to the first core from among the first to Pth cores, and
      at least one single-core optical fiber,
   a core of the single-core optical fiber of the Kth member is coupled to a coupled core that is other than the first core from among the first to Pth cores,
   cores of a multicore optical fiber of an Mth (M is an integer of 1 to N−1) member of the first to Nth members are connected to cores of a multicore optical fiber of an (M+1)th member of the first to Nth members,
   a total number of single-core optical fibers that are included in the first to Nth members is P, and
   each of P cores of the multicore optical fibers configured through the connection of the first to Nth members is connected to a core of one of the P single-core optical fibers included in the first to Nth members.

2. The optical coupler according to claim 1,
   wherein P is equal to N, and
   a number of single-core optical fibers included in the Kth member is one.

3. The optical coupler according to claim 2,
   wherein the cores of the multicore optical fiber of the Mth member and the cores of the multicore optical fiber of the (M+1)th member are connected in a state where the first core of the (M+1)th member is rotated with respect to the first core of the Mth member by $2\pi/N$.

4. The optical coupler according to claim 1,
   wherein P is equal to 2×N,
   a number of single-core optical fibers included in the Kth member is two, and
   the coupled cores of the Kth member are cores positioned on opposite sides to each other with respect to a center of the multicore optical fiber.

5. The optical coupler according to claim 4,
   wherein the cores of the multicore optical fiber of the Mth member and the cores of the multicore optical fiber of the (M+1)th member are connected in a state where the first core of the (M+1)th member is rotated with respect to the first core of the Mth member by $\pi/N$.

6. The optical coupler according to claim 1,
   wherein N=2,
   P is 2×Q (Q is an integer of one or greater),
   a number of single-core optical fibers included in the Kth member is Q, and
   the coupled cores of the Kth member are cores disposed at regular intervals in the circular shape.

7. The optical coupler according to claim 6,
   wherein the coupled core of the first member is connected to a core that is other than the coupled core of a second member.

8. The optical coupler according to claim 1,
   wherein, at a wavelength of signal light, a coupling ratio between the core of the single-core optical fiber of the Kth member and the coupled core is higher than a coupling ratio between the core of the single-core optical fiber and a core that is other than the coupled core in the multicore optical fiber of the Kth member.

9. An optical amplifier that includes an optical coupler, wherein
   the optical coupler comprises first to Nth (N is an integer of two or greater) members, and
   wherein a Kth (K is an integer of 1 to N) member includes:
      a multicore optical fiber that includes first to Pth (P is an integer of N or greater) cores disposed at regular intervals in a circular shape, and a marker disposed at a position closest to the first core from among the first to Pth cores, and
      at least one single-core optical fiber,
   a core of the single-core optical fiber of the Kth member is coupled to a coupled core that is other than the first core from among the first to Pth cores,
   cores of a multicore optical fiber of an Mth (Mis an integer of 1 to N−1) member of the first to Nth members are connected to cores of a multicore optical fiber of an (M+1)th member of the first to Nth members,
   a total number of single-core optical fibers that are included in the first to Nth members is P, and
   each of P cores of the multicore optical fibers configured through the connection of the first to Nth members is connected to a core of one of the P single-core optical fibers included in the first to Nth members, and
   wherein each of the cores of the multicore optical fiber of the Kth member is configured to amplify signal light that propagates through the core using pump light that propagates through the core.

10. The optical amplifier according to claim 9,
   wherein a coupling ratio between the core of the single-core optical fiber of the Kth member and the coupled core at a wavelength of the pump light is higher than a coupling ratio at a wavelength of the signal light.

* * * * *